United States Patent [19]

Lawrence et al.

[11] 3,911,227

[45] Oct. 7, 1975

[54] TELECOMMUNICATION EXCHANGE APPARATUS FOR TRANSLATING SEMI-PERMANENT CHANNEL INFORMATION

[76] Inventors: Gerald Norman Lawrence, 180 Baginton Road; Martin Ward, 17 Exminster Road, both of Styvechale, Coventry, Warwickshire, England

[22] Filed: Dec. 1, 1972

[21] Appl. No.: 311,387

[30] Foreign Application Priority Data

Dec. 3, 1971 United Kingdom.............. 56229/71

[52] U.S. Cl. ......................... 179/18 ES; 179/18 ET

[51] Int. Cl.² ......................................... H04Q 3/54

[58] Field of Search ........ 179/18 ES, 18 ET, 18 EB, 179/18 B; 340/172.5

[56] References Cited

UNITED STATES PATENTS

| | | | |
|---|---|---|---|
| 3,560,661 | 2/1971 | Kobus et al. | 179/18 ET |
| 3,613,089 | 10/1971 | Karp | 340/172.5 |
| 3,699,525 | 10/1972 | Klavins | 340/172.5 |

*Primary Examiner*—Thomas W. Brown
*Attorney, Agent, or Firm*—Kirschstein, Kirschstein, Ottinger & Frank

[57] ABSTRACT

Telecommunications exchange apparatus having an associative (i.e. contents-addressable) memory for use in retrieving certain items of control information. Thus, the memory may be used for: equipment number to directory number translation, and vice versa; determining the states of subscribers' lines and junctions; PABX line hunting; control of calls to and from party lines; control of special facilities (e.g. call transfer); and traffic analysis.

1 Claim, 4 Drawing Figures

Figure 1:
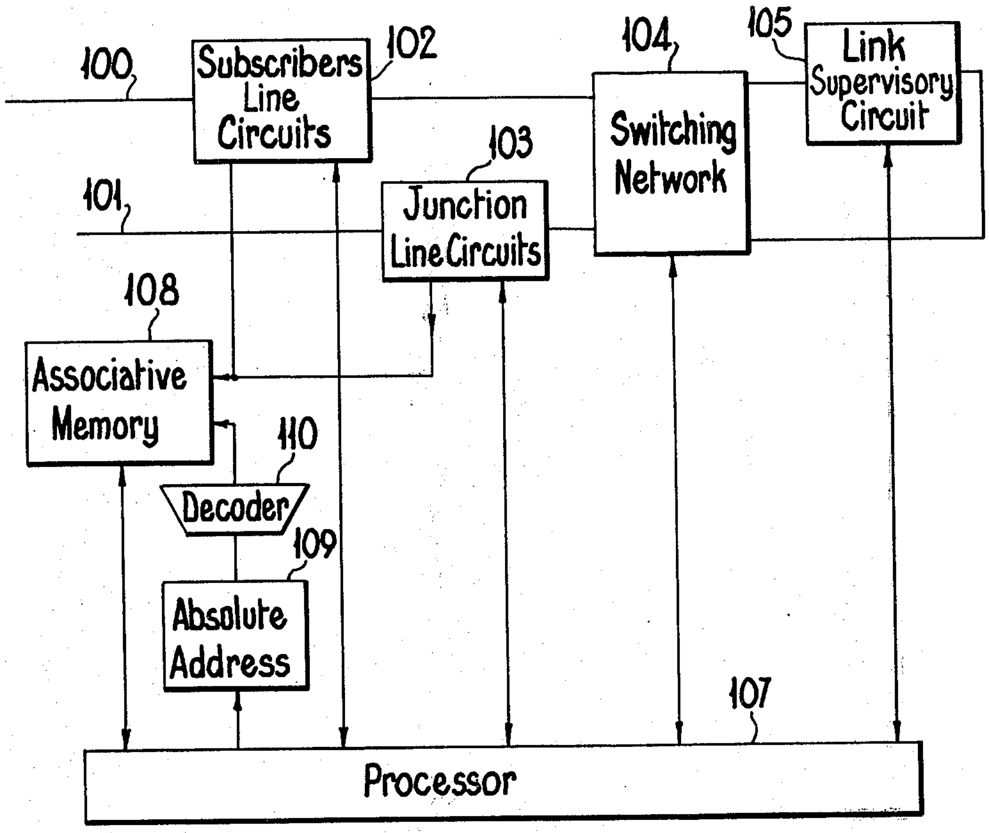

TELECOMMUNICATION EXCHANGE APPARATUS FOR TRANSLATING SEMI-PERMANENT CHANNEL INFORMATION

This invention relates to telecommunications exchange apparatus.

Telecommunications exchanges, such as telephone exchanges for example, are of course well known. Such exchanges generally have to deal with a large number of telecommunication channels, so as to establish connections between the channels in response to signalling information. In addition, present day exchanges are required to provide automatically certain special services such as changed number interception and call transfer, and to perform certain operations such as traffic analysis and metering of calls for charging to subscribers. The design of exchanges is further complicated by the existence of arrangements such as private automatic branch exchanges (P.A.B.X.'s) and party lines.

The present invention is based on the realisation by the inventors that an associative memory is an extremely useful facility in a telecommunications exchange, and can lead to considerable simplification in the design of the exchange.

By an associative memory is meant herein a memory in which a word location can be addressed by all or part of its contents. In a conventional, non-associative memory, each word is allocated an address corresponding to the actual hardware location of the word. Any desired word can then be accessed by applying its address to an "address" input, this address being decoded and used to access the corresponding hardware location. In contrast, an associative memory can be accessed by applying an input item of information to an "associate" input, thereby causing this item to be compared with the contents of each word in the memory, whereupon a word whose contents match the input item in some predetermined manner is accessed.

As far as the applicants are aware, the use of an associative memory in a telecommunications exchange has never before been suggested, nor have the advantages of using such a memory in this way been previously appreciated.

Thus, according to the invention, telecommunications exchange apparatus comprises: switching means for selectively interconnecting said channels; control means for operating said switching means in response to signalling information received over said channels; an associative memory having a plurality of words of storage space, each of which has a plurality of fields for respectively containing a plurality of related items of control information for the control means; and addressing means responsive to said control means for addressing said memory with at least one item of control information, thereby causing a word of the memory, whose contents match said at least one item, to be accessed for transfer of information between that word and the control means.

The associative memory may for example be used to perform any one or any combination of the following functions in the telecommunications exchange.

a. The associative memory may be conveniently used to provide identification of those telecommunications channels which are in a given state (e.g. "free", "calling" or "set up") at a given point of time.

Thus, conveniently, each of the words of said memory is associated with a respective one of said channels, each word having at least two fields for respectively containing items of control information specifying the identity of the associated channel and the condition of that channel, and said control means is arranged periodically to cause said addressing means to address the memory with an item of information specifying a particular condition, so as to cause each word of the memory whose contents match that item to be accessed in turn to read out the items of information specifying the identities of the associated line circuits, thereby identifying those channels which are in said particular condition.

b. Each telecommunications channel generally has associated with it two numbers: a "directory number" (DN) which provides, in effect, a software address for the channel, and an "equipment number" which identifies the actual hardware in the exchange associated with the channel. When a call is made through the exchange, the DN of the called channel will be known, but the EN will be required to enable the call to be connected. Similarly, when a call is made through the exchange, the EN of the calling channel will be known, but the DN will be required for certain operations such as accounting, call trace etc. The associative memory may conveniently be used to perform the required DN-to-EN and EN-to-DN translations.

Thus, conveniently, each of the words of said memory is associated with a respective one of said channels, each word having at least two fields for respectively containing items of control information specifying an equipment number and a directory number for the associated channel.

DN-to-EN translation can then be effected by addressing the memory with the DN of the called channel, while EN-to-DN translation can be similarly effected by addressing the memory with the EN of the calling channel.

c. In some cases, two or more of the channels may serve a common destination. For example, two or more subscribers' lines may serve a single private automatic branch exchange (P.A.B.X.), or two or more junctions may form a junction group between two exchanges. In such a case, the associative memory may conveniently serve to perform a search for a free channel to that destination.

d. A channel from the exchange may serve a plurality of destinations, e.g. as in the case of a party line. In this case, the associative memory may conveniently be used to identify all those destinations when a call is made to or from one of them, to permit each of those destination to be marked "busy".

e. The associative memory may be used to enable a rapid check to be made to determine whether or not a given channel has special facilities (e.g. call transfer, changed number interception, etc.) associated with it.

f. The associative memory may be used to perform an analysis of the traffic handled by the telecommunications exchange.

Figure 3:
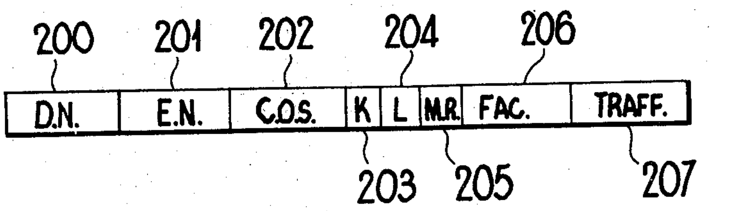
Figure 2A:
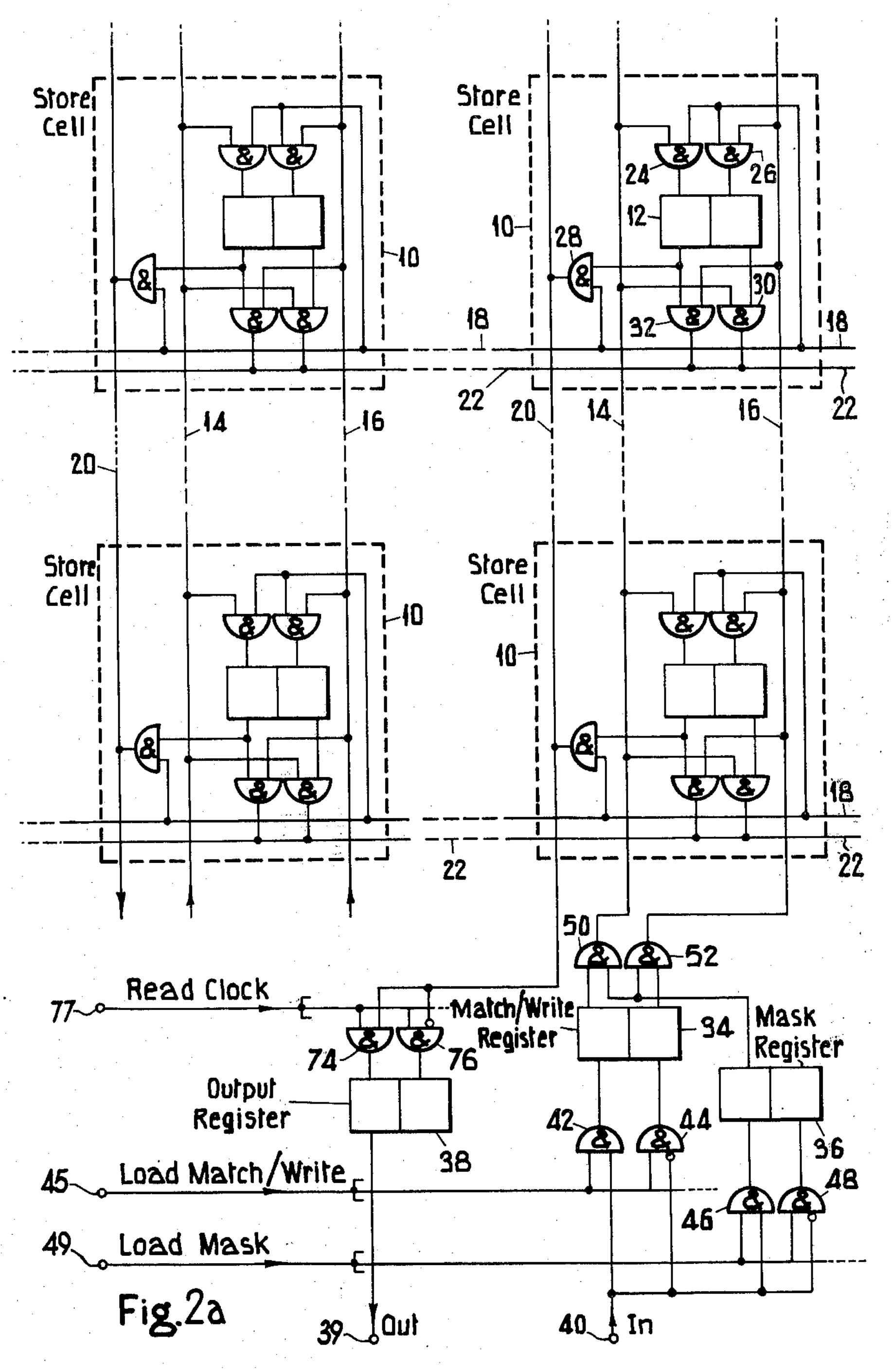
Figures 2B, 2C:
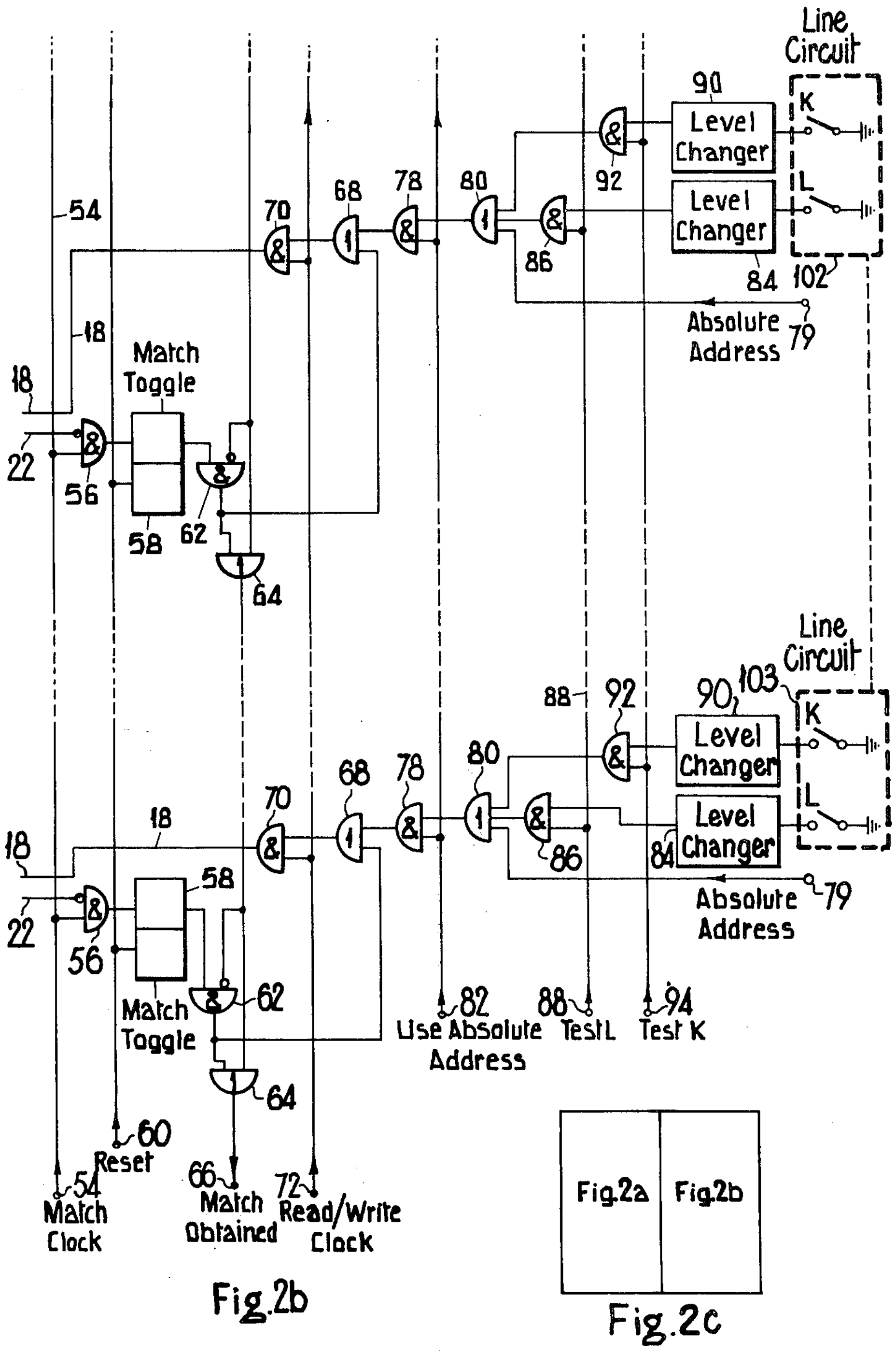

One telecommunications exchange apparatus in accordance with the invention will now be described, by way of example, with reference to the accompanying drawings, of which:

FIG. 1 is a schematic block diagram of the exchange;

FIGS. 2*a* and 2*b*, when arranged as shown in FIG. 2*c*, form a schematic circuit diagram of a part of the exchange, including an associative memory; and FIG. 3 represents schematically the contents of one word of the associative memory.

Referring to FIG. 1, the exchange is arranged to serve a large number of communications channels, which in this case comprise subscribers' lines 100, and junctions 101 (only one of each shown). Each subscriber's line 100 is connected to a subscriber's line circuit 102, while each junction 101 is connected to a junction line circuit (relay set) 103. Subscribers' line circuits can be connected to each other, or to outgoing junction line circuits, by means of a switching network 104 and link supervisory circuits 105 (only one shown), which perform various functions such as injecting tones and meter pulses. Incoming junctions may be connected to subscribers' line circuits and outgoing junction line circuits in a similar manner.

The interrogation and marking of paths through the switching network is performed by means of instructions applied to the switching network 104 from a stored-program control data processor 107.

The equipment described so far may consist of known telecommunications exchange equipment. Thus, the subscribers' line circuits 102 and the junction line circuits 103 may be of conventional form. The switching network 104 may, for example, comprise a known crossbar switch, or a reed relay switching network. The data processor 107 may be a specially designed communications processor such as the 'SPC Mark II communications processor manufactured by GEC Telecommunications Ltd., Coventry, England, or may comprise a known general purpose digital computer, suitably programmed to handle the establishment of calls through the exchange. It will be appreciated that the principles of stored-program control of a telecommunications exchange are well known in the art, and therefore will not be described in detail. Basically, however, the operation of the data processor is as follows.

The processor 107 periodically scans the line circuits 102 and 103 to detect any changes of state since the last scan. In this way, the processor detects the presence of a calling condition on any of the lines 100 or incoming junctions 101. When a calling condition is detected, the processor causes the calling line circuit to be scanned more frequently, so as to extract signalling information, according to the form of signalling employed (e.g. loop-disconnect, 10 impulses-per-second signalling or multi-frequency signalling). The processor 107 then operates the switching network 104 to establish the required connection between the calling line circuit and another of the line circuits, as determined by the received signalling information. After a call has been established, the processor 107 continues scanning, in order to detect termination of the call, whereupon it will instruct the switching network to clear the connection.

In known stored-program controlled telecommunications exchanges, the data processor is provided with various memories and registers for use in connection with the various data processing operations it performs. In the present apparatus, however, the processor 107 is provided additionally with an associative memory 108, which is utilised to perform various operations, as will be described.

Referring to FIG. 2*a*, the associative memory comprises a rectangular array of identical associative memory cells 10. Each row of the array represents a word location of storage space, the number of columns being the number of bits in each word.

Each memory cell 10 comprises a bistable circuit 12, a "1" data input line 14, a "0" data input line 16, an address input line 18, a data output line 20, and a match output line 22.

If a signal representing a binary 1 is applied to the 1 input line 14 simultaneously with a binary 1 applied to the address input line 18, a binary 1 output is produced from an AND gate 24 causing the bistable circuit 12 to switch into a first state representing a 1 stored in the cell. If, on the other hand, a binary 1 is applied to the 0 input line 16 simultaneously with a binary 1 applied to the address line 18, a binary 1 output is produced from an AND gate 26 causing the bistable circuit 12 to switch into its other state, representing a stored 0.

A binary 1 applied to the address line 18 alone will cause the contents of the cell to be read out into the data output line 20. Thus, if the bistable 12 is in its first state, a binary 1 applied to the address line 18 will produce a binary 1 output from AND gate 28, which appears on the output line 20 to signify a stored 1. If, on the other hand, the bistable 12 is in its other state, the output of AND gate 28 will remain at 0, indicating that a 0 is stored.

As described so far, the cell 10 is capable of operating as a conventional memory element. However, the cell 10 can also operate in an "associative" mode, as follows.

If a binary 1 is applied to the 1 input line 14, then, if the bistable circuit 12 is in its second state representing a stored 0, a binary 1 output will be produced from AND gate 30 and will appear on the match output line 22, indicating a "mismatch" between the input bit and the contents of the cell. If, on the other hand, the bistable circuit 12 is in its first state representing a stored 1, the output of the AND gate 30 will remain at 0 indicating a "match".

Similarly, if a binary 1 is applied to the 0 input line 16, then if the bistable circuit is in its first state representing a stored 1 a binary 1, representing a mismatch, will be produced on line 22 from AND gate 32, while, if the bistable circuit is in its second state, the output of AND gate 32 will remain at 0, indicating a match.

Each of the 1 and 0 input lines 14 and 16 and the data lines 20 is common to all the cells 10 in a column. Similarly, each of the address lines 18 and the match lines 22 is common to all the cells 10 in a row.

Referring still to FIG. 2*a*, the memory has three registers associated with it: a match/write register, comprising a plurality of bistable circuits 34, one for each column of the memory; a mask register, comprising a plurality of bistable circuits 36, one for each column; and an output register comprising a plurality of bistable circuits 38, one for each column. (Only one bistable circuit 34, 36, 38 of each register is shown in the drawing).

In operation, binary input data applied to a set of input terminals 40 (one for each column of the memory) can be loaded in parallel, by way of AND gates 42, 44 (one pair for each column of the memory) into the respective bistables 34 of the match/write register, on receipt of a "load match/write" clock pulse from an input terminal 45. Alternatively, the input data can be loaded in parallel into the respective bistables 36 of the mask register by way of AND gates 46, 48 (one pair for each column), on receipt of a "load mask" clock pulse from an input terminal 49.

Data stored in the bistables 34 of the input register are applied by way of AND gates 50 and 52, to the 1 and 0 input lines 14 and 16 of those columns of the memory for which a 1 is stored in the corresponding bistable 36 of the mask register. Where, on the other hand, a 0 is stored in a bistable 36, this will inhibit the AND gates 50 and 52 so that no signal will be applied to either of the corresponding input lines 14 and 16.

As previously explained, a 1 mismatch signal will be produced on a match output line 22 by each memory cell whose contents do not match the input on the corresponding input lines 14, 16. Thus, if there is any mismatch at all between the contents of a word (i.e. a row of cells 10) and the data applied to the respective input lines 14, 16, a 1 mismatch signal is produced from the match output line 22 of that word; a 0 will only appear if there is a complete match. It should be noted, however, that this comparison between the input data and the contents of the memory is only performed in those colums of the memory for which the corresponding mask register bistable 36 contains a 1, since no input signals are applied to the input lines 14, 16 of the other columns of the memory.

This provides the facility whereby the associative memory can be addressed by data in selected columns of the memory, so as to obtain a match indication on those words which contain the same data in those columns, irrespective of the contents of the word in other columns.

The output signals appearing on output lines 20 of the memory can be written into the respective bistables 38 of the output register by way of AND gates 74, 76 on receipt of a "read clock" pulse from an input terminal 77. The contents of the output register appear at respective output terminals 39.

Referring now to FIG. 2*b* as well as FIG. 2*a*, the states of the match output lines 22 can be read out by means of a "match" clock signal applied to an input terminal 54. This signal causes the states of the match lines 22 to be written into respective match toggles 58 via respective AND gates 56. Thus, a toggle 58 will be switched into a first state if there are no mismatch signals on the corresponding match line (i.e. if the input data applied to input lines 14, 16 exactly match the contents of the word location) and will be switched into a second state if a mismatch signal is present.

The match toggles 58 can be reset by a signal applied to an input terminal 60, before testing for another match.

The outputs of the match toggles 58 are applied to respective AND gates 62, the outputs of which are applied to a chain of OR gates 64, so that if a match indication is present at any one of the toggles 58, a binary 1 will appear at an output terminal 66 at the foot of the chain of OR gates.

The output of each OR gate 64 is also applied as an inhibiting input to the next AND gate 62 immediately below it (as viewed in the drawing). Thus, in the event of more than one match indication being obtained, only the one of the AND gates 62 corresponding to the highest (uppermost) matching word in the memory will produce an output binary 1.

A binary 1 from an AND gate 62 can be used to address the corresponding word of the memory, by way of an OR gate 68, and an AND gate 70, on application of an enabling signal from a read/write clock input terminal 72 to the AND gates 70. A word of the memory which is addressed in this way can then either have its contents read into the output register 38, by means of a read clock signal applied to terminal 77, or can be written into, from the match/write register 34.

To summarise, it will be seen that a word in the memory can be addressed by the contents of a part of the word (as determined by the positions of 1s in the mask register 36) to permit the whole word to be read or written into. Therefore, if each word contains two associated items of information, one item can be used to address the memory to retrieve the other associated item.

In addition to this associative mode of operation, a word in the memory can also be addressed by writing its absolute address into an absolute address register 109 (FIG. 1), from the processor 107. This address is decoded by a decoder 110, the outputs of which are applied respectively to the address lines 18 of the memory by way of respective terminals 79, OR gates 80, AND gates 78, the OR gates 68 and the AND gates 70.

The AND gates 78 are enabled by signals applied to an input terminal 82, while the AND gates 70 are, as previously described, enabled by signals applied to input terminal 72. Information can then be written into the addressed word from the match/write register or read out into the output register. Information can be written into several words in parallel by applying a number of absolute addresses to the address lines 18 in parallel. Of course, the same information will then be written into each word, but this is useful, for example, for clearing the store to zero.

FIG. 2*b* also shows one of the subscribers' line circuits 102 and one of the junction line circuits 103 shown in FIG. 1. Each of these line circuits has a word of the associative memory uniquely associated with it, this word being used to store various items of control information relating to the line circuit. Each line circuit includes two relays, the so-called L and K relays, one set of contacts of each being shown in the drawing.

The terms "L relay" and "K relay" are well known in the art (see for example J. Atkinson "Telephony" Volume II page 254). Thus, the K relay is a relay having contacts which when operated connect the associated subscriber's line or junction to the exchange, this relay therefore being released when the line or junction is free and operated when the line or junction is busy. The L relay is normally released, but is operated when a call is being initiated over the line or junction, and is released again when the call is set up. Thus the states of these two relays together provide an indication of the state of the associated line or junction (i.e. busy, free or calling).

The L relays are connected by way of respective voltage level changes 84 and AND gates 86 to the OR gates 80 and thence to the address lines 18 of the associated words of the memory. The AND gates 86 can be enabled by a binary 1 applied from a "test L" terminal 88. If the AND gates 78 and the AND gates 70 are also enabled, as previously described, a binary 1 is applied to each of the address lines 18 for which the corresponding L relay is operated.

Similarly, the K relays are connected by way of respective voltage level changers 90 and AND gates 92 to the OR gates 80 and thence to the address lines 18 of the associated words of the memory. The AND gates 92 can be enabled by a binary 1 applied from a test K terminal 94. If the AND gates 78 and the AND gates 70 are also enabled, as previously described, a binary 1 is applied to each of the address lines 18 for which the corresponding K relay is operated.

The associative memory is controlled by means of the processor 107, which is arranged to apply input data to the data input terminals 40 of the associative memory, and to read output data from the data output terminals 39 of the memory. The processor 107 also controls the input signals applied to the read clock terminal 77, the load match/write terminal 45, the load mask terminal 49, the match clock terminal 54, the "reset" terminal 60, the read/write clock terminal 66, the "use absolute address" terminal 82, the test L terminal 88, and the test K terminal 94, and reads the output signal at the match obtained terminal 66.

Referring now to FIG. 3, each word of the associative memory is divided into a number of fields, for storing a number of related terms of information concerning the associated line circuit. One field 200 is used to store the directory number (DN) and another field 201 is used to store the equipment number (EN) of the associated line circuit. Another field 202 is used to store an indication of the class of service (COS), in the case where the word is associated with a subscriber's line circuit. Two further fields 203, 204, of one bit each, are used to store the states of the K and L relays. Another field 205, also of one bit, is used as a "match resolve" (MR) bit, as will be described. A further field 206 indicates any special facilities, (such as call transfer, changed number interception etc) associated with a subscriber's line circuit, and finally a field 207 serves as a traffic count for traffic analysis.

The various functions of the associative memory in the exchange will now be described, with reference to FIGS. 2 and 3.

EN to DN and DN to EN translation.

When a call is originated from a subscriber's line or an incoming junction, the EN of the line or junction is immediately known to the processor, but the DN and COS are required. The following procedure is therefore initiated by the processor, by applying suitable instructions to the associative memory.

a. The match/write register of the memory is loaded with the subscriber's EN in the bit positions corresponding to the EN field 201.

b. The mask register is loaded with 1's in the bit positions corresponding to the EN field 201.

c. A binary 1 is applied to the match clock input terminal 54.

d. A check is made to see if a binary 1 is present at match obtained output terminal 66.

e. If a binary 1 is present at terminal 66, a binary 1 is applied to the read/write clock terminal 72 and also to the read clock terminal 77, causing the whole of the contents of the matched word to be read out of the memory, and written into the output register 38. The required DN and COS can then be extracted from the output register and used by the processor to control the connection of the call.

f. If a binary 1 is not received from the match obtained terminal 66, a check is made by the processor to see if sufficient time has elapsed for a pulse to propagate through the entire length of the chain of OR gates 64. If sufficient time has not elapsed, the procedure returns to step (d) above. If, on the other hand, sufficient time has elapsed, a fault condition must be present, (since the procedure has been unable to find a DN corresponding to the calling subscriber's EN) and a warning is therefore produced by the processor for attention by service engineers.

When a call is made to a subscriber, or junction, the DN is given by the number dialled by the caller, and the EN and COS of the called line or junction are required to connect the call. The same procedure as described above is followed, except that the match register is loaded with the DN in the bit positions corresponding to the DN field 200, and the mask register is loaded with 1's in the positions corresponding to the DN field 200. The EN and COS are then obtained from the output register. If no match can be obtained, this indicates that the called number is a spare line, and the "number unobtainable" tone is therefore returned to the line circuit by the processor.

Line scanning

The memory can be loaded with the current states of the L and K relays by the following procedure, which is initiated by the processor by applying suitable instructions to the memory. (It is assumed that the LK bits of all the words in the memory are initially reset to 00).

a. The match/write register is loaded with a 1 in the L-bit position.

b. The mask register is loaded with a 1 in the L-bit position.

c. A binary 1 is applied to the test L terminal 88, to the use absolute address terminal 82, and the read/write clock terminal 72, causing the states of the L relays to be written in parallel into the L-bit fields 204 of all the words in the memory.

d. The match/write register is loaded with a 1 in the K-bit position.

e. The mask register is loaded with a 1 in the K-bit position.

f. A binary 1 is applied to the test K terminal 94, and also to the use absolute address terminal 82 and to the read/write clock terminal 72, causing the states of the K relays to be written in parallel into the K-bit fields 203 of all the words in the memory.

The memory therefore now stores a 1 for every L or K relay which is operated. This updating procedure is performed at periodic intervals, say every 50 milliseconds.

The memory can now be addressed with a selected combination of L-and K-bits, to determine which lines are in a given state. For any given combination of L- and K-bits, it is to be expected that more than one word will match. However, as explained above, only one of the matched words will be read out of the memory. In order to obtain the other matched words, the L- and K-bits of the first matched word are modified, and the matching process is repeated.

For example, the following procedure is performed periodically in order to determine which lines or junctions are in a calling condition, i.e. with L=1 and K=0.

a. The match/write register is loaded with the bits 10 in the LK bit positions.

b. The mask register is loaded with the bits 11 in the LK bit positions.

c. A binary 1 is applied to the match clock terminal 54.

d. A check is made to see if a binary 1 is present at match obtained terminal 66.

e. If a binary 1 is not present at match obtained terminal 66, a check is made to see if sufficient time has elapsed to allow a pulse to propagate through the chain of OR gates 64. If not, the procedure returns to step (d). If sufficient time has elapsed, the procedure terminates.

f. If a binary 1 is present at match obtained terminal 66, a binary 1 is applied to read/write clock terminal 72, causing the matched word to be addressed, and a binary 1 is applied to read clock terminal 77 causing the contents of the matched word to be read out into the output register.

g. The match/write register is loaded with the bits 00 in the LK positions.

h. A binary 1 is applied to the write clock terminal 72, causing the bits 00 to be written into the LK bit positions 204 and 203 of the matched word in the memory.

i. The output register is unloaded.

j. The match toggles 58 are reset.

The procedure is now repeated, from step (a). The word which was previously matched will not match this time, since its L-and K-bits have been modified. Therefore, a different match (if any) will be obtained. In this way, all the lines having L=1 and K=0 are identified.

As an alternative to modifying the L- and K- bits, the match resolve bit 205 may be used, this bit being modified when a match is found, to prevent the same match from being repeated.

PABX line hunting.

A private automatic branch exchange (PABX) with more than one line will have several values of EN corresponding to the same DN. When an incoming call is made to the PABX, the DN will be known, and each EN of the PABX must be examined to find a free line.

As described above, when an incoming call is made, the associative memory is addressed with the DN of the called line, and the EN and COS are read out into the output register. If the called DN corresonds to a PABX, the COS read out will indicate this, and will signify to the processor that the EN read out is not to be interpreted as a genuine equipment number, but as a start address for a list of EN's stored in some other memory, (which may be non-associative). Line hunting is performed by the processor by indexing down the list and determining whether the corresponding line is free or busy.

Alternatively, the associative memory may be arranged to contain a separate word for each line of the PABX. These words will therefore contain the same DN, but different EN's.

When an incoming call is made to the PABX, the following procedure is performed. (Initially the match resolve (MR) bit of each word in the memory is set to zero).

a. The match register is loaded with the DN of the PABX at the appropriate bit positions.

b. The mask register is loaded with ones in the DN and MR bit positions.

c. A binary 1 is applied to the match clock terminal 54.

d. A check is made to see if a binary 1 is present at the match obtained terminal 66.

e. If a binary 1 is not present at terminal 66, a check is made to see if sufficient time has elapsed for a pulse to have propagated through the chain of OR gates 64. If not, the procedure returns to step (d). If so, then there are no free lines to the PABX.

f. If a binary 1 is present at "match obtained" terminal 66, a binary 1 is applied to the read/write clock terminal 72 to address the matched word, and the word is read out into the output register, by means of a binary 1 applied to read clock terminal 77.

g. The EN from this word is used by the processor to examine the corresponding line circuit, and if this line is free, the incoming call is set up to this line.

h. If the line is not free, the match register is loaded with the DN of the line in the appropriate bit positions, and with a 1 in the MR bit position. A binary 1 is then applied to the read/write clock terminal 72 causing the 1 to be written into the MR bit 205 of that word. The match toggles 58 are then reset.

The procedure is then repeated, from step (a). The word which was previously matched will not match this time, since its MR bit has been modified. Therefore, a different match will be obtained. The procedure is repeated until all the PABX lines have been examined and found busy, in which case a busy tone is returned, or until a free line is found.

In a modification of this alternative procedure for PABX line scanning, the L- and K-bits 204, 205 are used to identify which lines are free, so that a separate check is not required. (A free line is indicated by L=0 and K=0.)

The procedure is as follows.

a. The match register is loaded with the DN of the called PABX, and with 00 in the LK bit positions.

b. The mask resiter is loaded with ones in the DN and LK bit positions.

c. A binary 1 is applied to the match clock terminal 54.

d. A check is made to see if a binary 1 is present at match obtained terminal 66.

e. If this match obtained indication is not produced, a check is made to see if sufficient time has elapsed for propagation of a pulse through the chain of OR gates 64. If not, the procedure returns to step (d). If sufficient time has elapsed, then there are no free lines, and a busy tone is returned.

f. If a match obtained indication is produced, a binary 1 is applied to the read/write clock terminal 72 and to the read clock terminal 77, and the matched word is read into the output register.

This word will correspond to a free line of the PABX, and the EN is therefore used to set up the incoming call to this line.

Junction Hunting.

The procedures for line hunting in a PABX may be used to find a free circuit in a given junction group in the exchange. In this case, matching is performed on junction route information instead of the DN's of subscribers' lines.

Party Lines.

In contrast to PABX lines, party lines have only one EN but two or more DN's. A separate word in the associative memory is allocated to each DN of the party line, these words thus containing the same EN.

When one party makes or receives a call, all words associated with the party line must be marked busy. Thus, when a party makes a call, the EN of the party line is known, and this is used to address the associative memory repeatedly to mark each word with that EN as busy, using the technique of match resolving as described above in connection with PABX lines. On the other hand, when a call is made to a party, the DN of that party is known. This DN is used to address the associative memory, to obtain the EN of the party line. This EN can now be used to mark all the DN's of the party line as busy.

Special arrangements are necessary to detect when one party calls another party, and this can be done by comparing the EN's of the calling and called party.

Special Facilities.

In a telephone exchange, there are certain facilities which a small number of subscribers use, for relatively short periods of time; for example, Call Transfer, Changed Number Interception, etc. Every call made through the exchange has to be examined to see if one of these facilities applies to it.

The use of an associative memory in the exchange facilitates this examination, using the special facilities field 206 of each word.

Alternatively, those subscribers having a special facility may have their DN, EN and COS stored in a word in a separate, relatively small associative memory. When a call is made, this memory is addressed with either the DN or the EN of the subscriber, causing a very rapid search to be made to determine whether the subscriber has a special facility. If he has a special facility, a match obtained signal will be produced, which will initiate the setting up of the appropriate facility.

An entry in the memory is removed as soon as the subscriber returns to normal status.

Dialled code or route monitoring.

For traffic analysis it is necessary to record, for a predetermined period, the total duration of calls made over a given path.

Thus, in the present arrangement, each line circuit of relay set has a traffic count stored in field 207 of the associated word of the memory.

When a call is made, the dialled DN is used to address the memory, and the counting register of the word so addressed is periodically incremented by one.

Thus the contents of the counting registers keep a constant record of the traffic load of the various line circuits and relay sets.

Alternatively, it may be arranged that the counting register is only incremented once for each call. The traffic can then be calculated assuming that each call has a certain average duration (say 2 minutes).

We claim:

1. Telephone exchange apparatus for serving a plurality of exchange lines, said apparatus comprising:

A. switching means for selectively interconnecting said lines;

B. control means for operating said switching means in response to signalling information received over said lines;

C. an associative memory for storing a plurality of words of control information in respect of associated ones of said exchange lines, i. each of said words comprising at least a selection of control information items including:

a. directory number, b. equipment number, c. class of service, d. special facilities item, and e. a PABX-line-selector control item;

D. said control means being operative to read out a said word of control information from said associative memory by the application of a selected one of said information items to all of said plurality of words in parallel, i. identity between said selected information item and an item contained in any of said words causing the word containing the identical item to be read out and transferred to said control means for the interconnection of selected ones of said exchange lines, E. said associative memory being employed, both for identifying the directory number of a calling exchange line whose equipment number is evident, and for identifying the equipment number of a called exchange line whose directory number is evident, said associative memory being addressed by the equipment number of the calling exchange line, and by the directory number of the called exchange line in the two cases respectively.

* * * * *